United States Patent Office 3,198,786
Patented Aug. 3, 1965

3,198,786
ALKYL HEXAMETHYLENE-THIOLCARBAMATES
Harry Tilles, El Cerrito, and Ralston Curtis, Los Altos, Calif., assignors to Stauffer Chemical Company, New York, N.Y., a corporation of Delaware
No Drawing. Filed Apr. 27, 1964, Ser. No. 362,949
9 Claims. (Cl. 260—239)

This application is a continuation-in-part of U.S. application Serial No. 106,444, filed May 1, 1961, and now abandoned.

This invention relates to certain novel compositions of matter. More particularly, it has been found that certain alkyl 1-hexamethyleneimine-carbothiolates possess valuable herbicidal properties and are particularly useful as pre-emergence herbicides.

The compounds of the present invention are represented by the following formula:

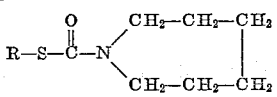

wherein R is a lower alykl group.

The closest prior art to the present claimed compounds known to applicants is U.S. Patent No. 2,187,719 which discloses only dithiocarbamates; Siefken, Chemical Abstracts, volume 44, pages 109–110 (1950) which mentions methyl 1-hexamethyleneimine carboxylate; and U.S. Patent No. 2,913,327 which discloses ethyl 1-pentamethyleneimine carbothiolate.

The following illustrative examples demonstrate the methods which may be employed to make typical compounds of the present invention.

EXAMPLE I

*Compound 1: Methyl 1-hexamethyleneiminecarbothiolate*

A 500 cc. flask was provided with stirrer, thermometer and addition funnel. A solution of 14.0 g. (0.35 mole) of sodium hydroxide in 200 cc. of water was charged to the flask and this was followed by the addition of 31.7 g. (0.32 mole) of hexamethyleneimine in 100 cc. of n-pentane. To the vigorously stirred mixture with cooling was then added 33.2 g. (0.30 mole) of methyl chlorothiolformate. The temperature of the reaction mixture was maintained at 15–20° C. After the addition was completed, the mixture was stirred for an additional 5 minutes and then phase separated. The upper organic phase was washed with 2 50-cc. portions of dilute hydrochloric acid (5 cc. of conc. hydrochloric acid made up to a volume of 55 cc. with water) and with 3 50-cc. portions of water. It was then dried over anhydrous magnesium sulfate, filtered and concentrated on the steam bath. The residual liquid was then fractionally distilled under vacuum. There was obtained 46.6 g. (90.0% yield) of methyl 1-hexamethyleneiminecarbothiolate, B.P. (10 mm.) 129.5–130.5° C., $n_D^{30}$ 1.5235.

*Analysis.*—Calculated for $C_8H_{15}NOS$: N, 8.08%. Found: N, 7.96%.

EXAMPLE II

*Compound 2: Ethyl 1-hexamethyleneiminecarbothiolate*

When the general procedure of Example I was repeated except that 31.7 g. (0.32 mole) of hexamethyleneimine, 37.4 g. (0.30 mole) of ethyl chlorothiolformate, 14.0 g. (0.35 mole) of sodium hydroxide dissolved in 200 cc. of water and 100 cc. of n-pentane were employed, there was obtained 51.9 g. (92.3% yield) of ethyl 1-hexamethyleneiminecarbothiolate, B.P. (10 mm.) 136.5–137.0° C., $n_D^{30}$ 1.5156.

*Analysis.*—Calculated for $C_9H_{17}NOS$: N, 7.48%. Found: N, 7.69%.

EXAMPLE III

*Compound 3: n-Propyl 1-hexamethyleneiminecarbothiolate*

When the general procedure of Example I was repeated except that 31.7 g. (0.32 mole) of hexamethyleneimine, 41.6 g. (0.30 mole) of n-propyl chlorothiolformate, 14.0 g. (0.35 mole) of sodium hydroxide dissolved in 200 cc. of water and 100 cc. of n-pentane were employed, there was obtained 55.8 g. (91.8% yield) of n-propyl 1-hexamethyleneiminecarbothiolate, B.P. (10 mm.) 148.0–148.5° C., $n_D^{30}$ 1.5108.

*Analysis.*—Calculated for $C_{10}H_{19}NOS$: N, 6.96%. Found: N, 7.21%.

EXAMPLE IV

*Compound 5: n-Butyl 1-hexamethyleneiminecarbothiolate*

When the general procedure of Example I was repeated except that 31.7 g. (0.32 mole) of hexamethyleneimine, 45.8 g. (0.30 mole) of n-butyl chlorothiolformate, 14.0 g. (0.35 mole) of sodium hydroxide dissolved in 200 cc. of water and 100 cc. of n-pentane were employed, there was obtained 61.8 g. (95.8% yield) of n-butyl 1-hexamethyleneiminecarbothiolate, B.P. (10 mm.) 161.0–161.5° C., $n_D^{30}$ 1.5073.

*Analysis.*—Calculated for $C_{11}H_{21}NOS$: N, 6.50%. Found: N, 6.58%.

EXAMPLE V

*Compound 7: sec-Butyl 1-hexamethyleneiminecarbothiolate*

When the general procedure of Example I was repeated except that 31.7 g. (0.32 mole) of hexamethyleneimine, 45.8 g. (0.30 mole) of sec-butyl chlorothiolformate, 14.0 g. (0.35 mole) of sodium hydroxide dissolved in 200 cc. of water and 100 cc. of n-pentane were employed, there was obtained 60.5 g. (93.9% yield) of sec-butyl 1-hexamethyleneiminecarbothiolate, B.P. (10 mm.) 150.5–151.0° C., $n_D^{30}$ 1.5069.

*Analysis.*—Calculated for $C_{11}H_{21}NOS$: N, 6.50%. Found: N, 6.68%.

EXAMPLE VI

*Compound 8: t-Butyl 1-hexamethyleneiminecarbothiolate*

When the general procedure of Example I was repeated except that 31.7 g. (0.32 mole) of hexamethyleneimine, 45.8 g. (0.30 mole) of t-butyl chlorothiolformate, 14.0 g. (0.35 mole) of sodium hydroxide dissolved in 200 cc. of water and 100 cc. of n-pentane were employed, there was obtained 58.2 g. (90.3% yield) of t-butyl 1-hexamethyleneiminecarbothiolate, B.P. (10 mm.) 139.0–140.0° C., $n_D^{30}$ 1.5058.

*Analysis.*—Calculated for $C_{11}H_{21}NOS$: N, 6.50%. Found: N, 6.61%.

EXAMPLE VII

*Compound 4: i - Propyl 1 - hexamethyleneiminecarbothiolate*

21.8 g. (0.22 mole) of hexamethyleneimine and 200 cc. of n-pentane were charged to 2 500-cc. Erlenmeyer flasks and 13.9 g. (0.10 mole) of isopropyl chlorothiolformate was added dropwise with ice cooling. After the addition, the mixture was worked up in the same manner as Example I. The product was not distilled but the volatiles were removed by subjecting the product to a current of air on the steam bath. There was obtained 18.8 g. (93.6% yield) of isopropyl 1-hexamethyleneiminecarbothiolate, $n_D^{30}$ 1.5080.

*Analysis.*—Calculated for $C_{10}H_{19}NOS$: N, 6.96%. Found: N, 7.17%.

EXAMPLE VIII

*Compound 6: i - Butyl 1 - hexamethyleneiminecarbothiolate*

When the general procedure of Example VII was repeated except that 22.2 g. (0.224 mole) of hexamethyleneimine, 16.3 g. (0.107 mole) of isobutyl chlorothiolformate and 200 cc. of n-pentane were employed, there was obtained 20.7 g. (90.2% yield) of isobutyl 1-hexamethyleneiminecarbothiolate, B.P. (10 mm.) 153.0–154.0° C., $n_D^{30}$ 1.5047.

*Analysis.*—Calculated for $C_{11}H_{21}NOS$: N, 6.50%. Found: N, 6.74%.

The compounds of the present invention have been extensively tested as herbicides and have been particularly evaluated as pre-emergence herbicides. Pre-emergence herbicides are ordinarily used to treat the soil in which the desired crop is to be planted or after seeding before the crop emerges. If the herbicide is harmless to the desired crop, seeds or seedlings, but phytotoxic to the weed seeds or seedlings most frequently encountered, the crop grows in a weed free environment.

The phytocidal compositions of the present invention may be applied to the soil in any of the convenient forms well known to those skilled in the art. For instance, it can be dissolved in a solvent, such as acetone, or emulsified and sprayed onto the soil; or it can be combined with a dry inert carrier and applied as a dust or as granules. The rates of application may vary widely depending on the results desired.

The phytotoxicity of the compounds of the present invention is shown by the results of the following testing method.

A quantity of Santa Cruz sandy loam soil contained in metal flats measuring 12″ by 8″ by 3″ was placed in a two gallon capacity cement mixer and treated with a weighed amount of the test compound dissolved in .6 ml. of acetone. The compound was applied to the soil surface with a pipette at a rate of 3 lbs. of active ingredient per acre and the mixer was then rotate to insure thorough distribution of the compound throughout the soil. The treated soil was placed back in the metal flat and seeded at ½″ depth to red oats, pigweed, Sudan grass, yellow nutgrass, yellow foxtail, quack grass, water grass, and lamb's-quarter (approximately 100 seeds of each weed species). The metal flats are kept in a greenhouse and a temperature of 70–84° F. is maintained. Twenty-eight days after treatment, the percentage germination of each species is determined and recorded along with the amount of growth as compared to the germination and growth of untreated controls.

The following chart shows the results of the test mentioned supra.

| Compound No. | Rate/Acre | Red Oats | | Pigweed | | Sudan Grass | | Yellow Nutgrass | |
|---|---|---|---|---|---|---|---|---|---|
| | | Ge. | Gr. | Ge. | Gr. | Ge. | Gr. | Ge. | Gr |
| 1 | 3 | 100 | 2 | 100 | 10 | 100 | 7 | 0 | |
| 3 | 3 | 100 | 3 | 0 | | 100 | 0+ | 0 | |
| 4 | 3 | 100 | 2 | 100 | 3 | 100 | 1 | 0 | |
| 5 | 3 | 100 | 6 | 100 | 10 | 100 | 4 | 30 | 1 |
| 6 | 3 | 100 | 2 | 0 | | 100 | 0+ | 0 | |
| 7 | 3 | 100 | 2 | 20 | 3 | 100 | 1 | 0 | |
| 8 | 3 | 100 | 6 | 100 | 10 | 100 | 2 | 100 | 4 |

| Compound No. | Rate/Acre | Yellow Foxtail | | Quack Grass | | Water Grass | | Lamb's Quarter | |
|---|---|---|---|---|---|---|---|---|---|
| | | Ge. | Gr. | Ge. | Gr. | Ge. | Gr. | Ge. | Gr. |
| 1 | 3 | 100 | 10 | 100 | 7 | 100 | 4 | 100 | 10 |
| 3 | 3 | 100 | 9 | 100 | 4 | 100 | 1 | 0 | |
| 4 | 3 | 100 | 0+ | 100 | 3 | 100 | 0+ | 0 | |
| 5 | 3 | 100 | 10 | 100 | 10 | 100 | 4 | 40 | 3 |
| 6 | 3 | 100 | 10 | 100 | 4 | 100 | 1 | 0 | |
| 7 | 3 | 100 | 0+ | 100 | 3 | 100 | 0+ | 0 | |
| 8 | 3 | 100 | 5 | 100 | 4 | 100 | 1 | 100 | 10 |

Ge.=Percentage of seeds germinating.
Gr.=Growth, wherein 10 equals normal growth, and 0 indicates no growth.

For the purpose of disposing of any alleged pertinency of the previously stated prior art, comparative tests were made of these typical prior art compounds in comparison to the compounds of the present invention. The ethyl compounds of each prior art series of compounds were chosen for comparison with the ethyl compound of the present invention in order to have a valid comparison and also since the ethyl compound is the only pertinent prior art compound mentioned in U.S. Patent 2,913,327. In these tests soil from the same source, seeds from the same source and duplicate growing conditions were used so that a valid comparison could be had. This procedure avoids problems of different growth rates due to different soil microorganisms, different seed batches and different climatic conditions.

In these tests, the following compounds were tested to determine their herbicidal activity:

(1) Compound 2 of the present application
Ethyl 1-hexamethyleneiminecarbothiolate $$C_2H_5-S-\overset{O}{\underset{\|}{C}}-N\begin{array}{c}CH_2-CH_2-CH_2\\ \phantom{N}\\ CH_2-CH_2-CH_2\end{array}$$

hereinafter referred to as Compound 2

(2)
$$C_2H_5O-\overset{O}{\underset{\|}{C}}-N\begin{array}{c}CH_2-CH_2-CH_2\\ \phantom{N}\\ CH_2-CH_2-CH_2\end{array}$$

hereinafter referred to as Compound A (3)
$$C_2H_5S-\overset{S}{\underset{\|}{C}}-N\begin{array}{c}CH_2-CH_2-CH_2\\ \phantom{N}\\ CH_2-CH_2-CH_2\end{array}$$

hereinafter referred to as Compound B, and (4)
$$C_2H_5S-\overset{S}{\underset{\|}{C}}-N\begin{array}{c}CH_2-CH_2\\ \phantom{N}\quad CH_2\\ CH_2-CH_2\end{array}$$

hereinafter referred to as Compound C.

The testing procedure followed was the same as that given in column 3 of the instant application except that results were read thirty-two and thirty-six days after treatment.

The following chart shows the results of the tests.

| Compound No. | Rate/Acre | Red Oats | | Pigweed | | Sudan Grass | | Yellow Nutgrass | |
|---|---|---|---|---|---|---|---|---|---|
| | | Ge. | Gr. | Ge. | Gr. | Ge. | Gr. | Ge. | Gr. |
| 2 | 3 | 0 | | 0 | | 0 | | 0 | |
| A | 20 | | | 100 | 10 | | | | |
| B | 3 | 60 | 4 | | | 100 | 3 | 100 | 3 |
| C | 3 | 20 | 5 | 100 | 10 | 60 | 7 | 100 | 8 |

| Compound No. | Rate/Acre | Water Grass | | Foxtail | |
|---|---|---|---|---|---|
| | | Ge. | Gr. | Ge. | Gr. |
| 3 | 3 | 0 | --- | 20 | 0 |
| A | 20 | 100 | 10 | --- | --- |
| B | 3 | 100 | 2 | 100 | 5 |
| C | 3 | 100 | 3 | 100 | 10 |

Ge.=Percentage of seeds germinating.
Gr.=Growth, wherein 10 equals normal growth, and 0 indicates no growth.

In addition, the compounds of the present invention are excellent selective herbicides in both rice and wheat crops since these crops are relatively unaffected by such compounds.

As described in the examples hereinbefore given, the method of making the compounds of the present invention involves reacting a lower alkyl chlorothioformate with hexamethyleneimine in a suitable solvent such as n-pentane. An alkali may be added to the reaction materials to maintain the reaction media alkaline to increase yields.

We claim:
1. A compound of the formula:

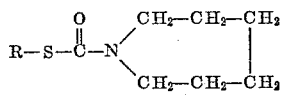

wherein R is a lower alkyl radical.

2. The compound methyl 1-hexamethyleneiminecarbothiolate.
3. The compound ethyl 1-hexamethyleneiminecarbothiolate.
4. The compound n-propyl 1-hexamethyleneiminecarbothiolate.
5. The compound of i-propyl 1-hexamethyleneiminecarbothiolate.
6. The compound n-butyl 1-hexamethyleneiminecarbothiolate.
7. The compound i-butyl 1-hexamethyleneiminecarbothiolate.
8. The compound sec-butyl 1-hexamethyleneiminecarbothiolate.
9. The compound t-butyl 1-hexamethyleneiminecarbothiolate.

References Cited by the Examiner
UNITED STATES PATENTS

| 2,187,719 | 1/40 | Williams | 260—239 |
| 2,913,327 | 11/59 | Tilles et al. | 260—455 |
| 2,992,091 | 7/61 | Harman et al. | 71—2.6 |
| 3,078,153 | 2/63 | Harman et al. | 71—2.5 |

OTHER REFERENCES

Conant et al.: The Chemistry of Organic Compounds (New York, 1947), pages 342–345.

Lowy et al.: An Introduction to Organic Chemistry (New York, 1945), page 213.

Siefkin: Chem. Abstracts, vol. 44, pages 109–110 (1950).

NICHOLAS S. RIZZO, *Primary Examiner*.

JOHN D. RANDOLPH, *Examiner*.

UNITED STATES PATENT OFFICE
Certificate

Patent No. 3,198,786                                                   Patented August 3, 1965

Harry Tilles and Ralston Curtis

Application having been made by Harry Tilles and Ralston Curtis, the inventors named in the patent above identified, and Stauffer Chemical Company, New York, N.Y., a corporation of Delaware, the assignee, for the issuance of a certificate under the provisions of Title 35, Section 256, of the United States Code, deleting the name of Ralston Curtis as a joint inventor, and a showing and proof of facts satisfying the requirements of the said section having been submitted, it is this 17th day of November 1970, certified that the name of the said Ralston Curtis is hereby deleted from the said patent as a joint inventor with the said Harry Tilles.

FRED W. SHERLING
*Associate Solicitor.*